Nov. 17, 1936.    N. W. ELMER    2,061,228
CONVEYER
Filed Aug. 12, 1935
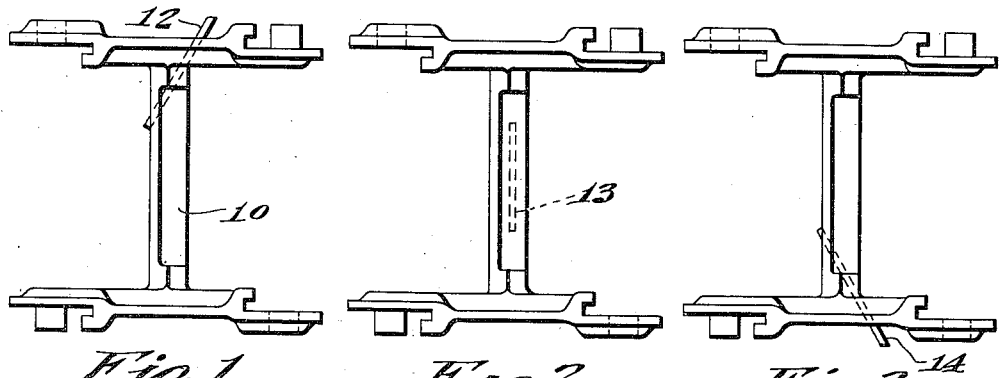
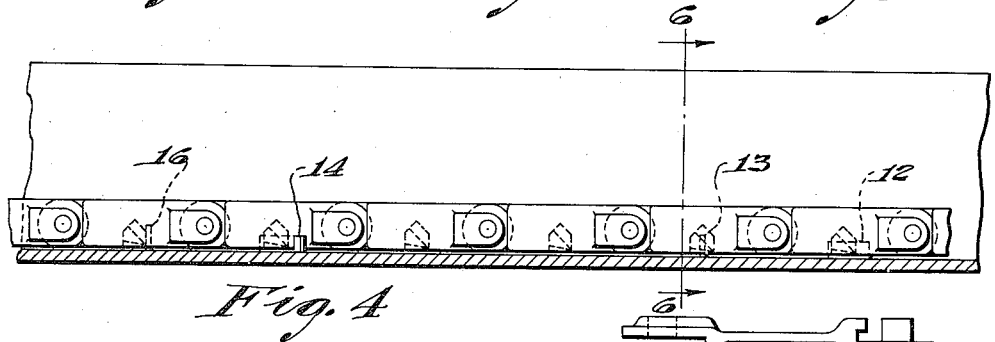
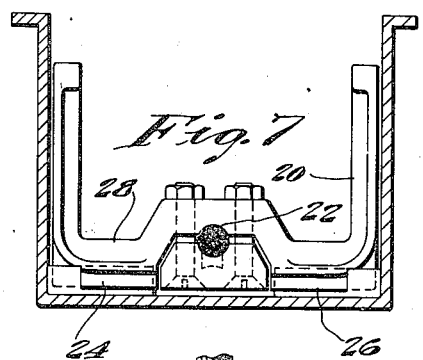
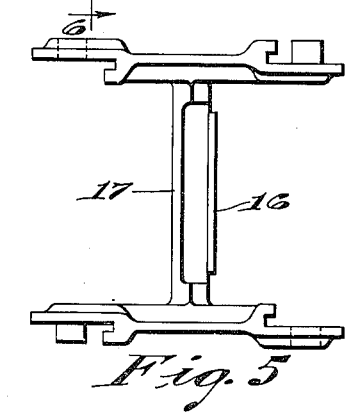
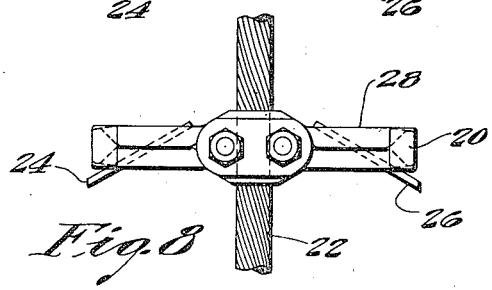
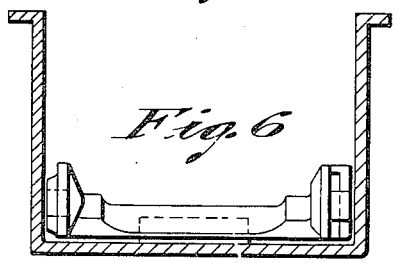
INVENTOR
Nixon W. Elmer
BY J. Stanley Churchill
ATTORNEY Patented Nov. 17, 1936

2,061,228

UNITED STATES PATENT OFFICE 2,061,228

CONVEYER

Nixon W. Elmer, Oak Park, Ill., assignor to Redler Conveyor Company, Quincy, Mass., a corporation of Massachusetts Application August 12, 1935, Serial No. 35,811

6 Claims. (Cl. 198—168)

This invention relates to a conveyer, and more particularly to a conveyer for conveying flowable solid material in a continuous stream.

In general, the object of the invention is to provide a novel and improved conveyer of the type forming the subject matter of the Redler Reissue Patent No. 18,445, in which provision is made for preventing the adherence of material to the walls of the casing through which the transporting element of the conveyer is drawn to thereby prevent building up of material on the walls of the casing while permitting the conveyer to function in a normal manner.

A further object of the invention is to provide a novel and improved conveyer of the character specified which is particularly adapted for the efficient conveying of sticky flowable materials.

With these general objects in view and such others as may hereinafter appear, the invention consists in the conveyer and in the various structures, arrangements and combinations of parts hereinafter described and particularly defined in the claims at the end of this specification.

In the drawing illustrating the preferred embodiment of the invention, Figs. 1, 2 and 3 are detailed views in plan of individual flights of the transporting elements of different embodiments of the present conveyer illustrating the provision of the flights with a scraping element in different locations; Fig. 4 is a longitudinal sectional view of a portion of a conveyer embodying the present invention and illustrating the provision of scrapers in positions corresponding to those shown in Figs. 1, 2 and 3; Fig. 5 is a detail in plan of still another form of a conveyer flight illustrating a scraping element attached to the face of the crossbar of the flight; Fig. 6 is a cross-sectional view taken on the line 6—6 of Fig. 4; Fig. 7 is a cross-sectional detail illustrating a modified form of a conveyer flight embodying the scrapers illustrated in Fig. 8; and Fig. 8 is a detail in plan of a conveyer flight shown in Fig. 7 and showing the scraping elements.

As above stated, the present invention relates to a conveyer of the type illustrated in the Redler Reissue Patent No. 18,445 for conveying flowable solid material in a continuous stream and is particularly designed for handling those sticky materials such as brown sugar, fuller's earth, clay and the like, with which some difficulty has heretofore been experienced. Experience during practical use of conveyers of the type illustrated in the Redler reissue patent, above referred to, has shown that when sticky materials of the character specified have been conveyed in a conveyer of this type, a tendency exists for the material being conveyed to accumulate upon and adhere to the bottom portions of the trough or casing through which the transporting element passes, and because of the fact that in the normal operation of the conveyer a tendency exists for the transporting element to float up off of the bottom of the casing, difficulty has been experienced in preventing such accumulation of material. As a result of the accumulation of material upon the bottom of the conveyer casing and of the tendency of the transporting element to float up off the bottom of the casing, both the ease of operation and the efficiency of the conveyer were noticeably decreased when sticky materials such as above mentioned were being conveyed. In some instances, and particularly where the sticky material was being conveyed through an open casing in a horizontal direction by a flat chain, the accumulation of the material on the bottom of the casing caused the chain to gradually rise through the material so that after an extended period of operation, the chain was merely conveying a very small layer of material and traveling in the upper portion of the casing, and in other instances where the sticky material was being conveyed in a closed conduit, the adherence of the sticky material to the bottom of the casing caused the transporting element to rise until the upper portions thereof were frictionally rubbed against the walls of the casing, thus interfering with the most successful and efficient operation of the conveyer.

In accordance with the present invention, provision is made for preventing the adherence of the material being conveyed to the walls of the casing, and particularly to the bottom of the casing in order to prevent the results above referred to and to increase the ease of operation and the efficiency of the conveyer, particularly when handling sticky materials of the character previously set forth, and this result is accomplished while permitting the normal floating of the transporting element a short distance above the bottom of the casing. Accordingly, at least one of the conveyer flights is provided with a scraping device for engaging and scraping the wall, particularly the bottom wall, of the casing to thereby prevent the adherence of the material thereto, and the size and height of the scraping device and the area of its cutting edge are so related to the weight of the transporting element, and to the distance at which the transporting element normally floats from the bottom of the casing, as to enable the scraper to engage and clean the bottom of the casing during the operation of the conveyer.

In some instances, particularly where the conveyer is used to transport materials of relatively high density and of substantial resistance to penetration, a plurality of relatively short scraper sections may and preferably will be secured to different flights of the conveyer and the individual scraper members will preferably be constructed with respect to both the weight of the conveying element and the resistance to penetration of the material, so that during operation of the conveyer, the successive scrapers may engage and function to clean the wall of the casing through which the material is to be conveyed, while permitting the conveying element to float.

Referring now to the drawing, particularly to Figs. 1, 2, 3 and 5, I have illustrated a plurality of conveyer flights capable, when operatively connected to conveyer flights either of the same construction or of any of the different constructions shown in such figures to form a complete transporting element and when drawn through a casing, of conveying flowable solid material in a continuous mass in a horizontal direction or through those angles below the angle of repose of the material being conveyed. In Fig. 1, I have illustrated a conveyer flight 10 as being provided with a scraper member 12 of hardened steel which is set into a groove formed in the under surface of the conveyer flight in such a position that the scraper member projects at an angle, as illustrated, beyond the bottom of the conveyer flight at a relatively short distance such as a sixteenth of an inch corresponding to the distance from the bottom of the casing at which the conveying element normally floats during the operation of the conveyer. As above stated, when the scraper members are to be employed in a conveyer for conveying sticky materials with a relatively high density and high resistance to penetration, it is preferred to employ in the complete conveyer a plurality of relatively short scraper members, and to correlate said scraper members with respect to both the weight of the conveying element and the resistance to penetration of the material being conveyed to insure that the desired scraping action may take place. As illustrated in Figs. 2 and 3, additional scraper members 13, 14 are mounted in a manner similar to the scraper 12 in the under portions of succeeding conveyer flights of the conveyer so that when the three conveyer flights illustrated in Figs. 1, 2 and 3 are embodied in a complete conveyer, the scraping members of the conveyer flights will cooperate to scrape across the entire bottom of the conveyer casing. In Fig. 5 I have illustrated a flight having a scraper 16 attached to the face of the crossbar 17 thereof and in Fig. 4 I have illustrated in section a conveyer embodying the flights shown in Figs. 1, 2, 3 and 5. It will be understood that the invention contemplates a conveyer in which the flights may be composed entirely of a single form of the individual flights shown in Figs. 1, 2, 3 and 5, and for purposes of illustration a portion of a conveyer has been shown in Fig. 4 embodying all of the different illustrated forms of flights.

As illustrated in the Redler reissue patent, above referred to, the conveyer flights may take various configurations and as typical of such conveyer flights, I have in Figs. 7 and 8 illustrated a U-shaped conveyer flight 20 mounted upon a cable 22 and provided with two scraper members 24, 26 set into grooves in the under surface of the crossbar 28 forming a part of the conveyer flight and arranged to extend at an angle to the direction of movement of the conveyer flight through the casing. The scraper members 24, 26 are arranged to project downwardly beyond the under surface of the flight a distance corresponding to the floating distance of the flight from the bottom of the casing.

From the description thus far it will be apparent that by the provision of scraper members upon one or more conveying elements arranged as above described, a conveyer of the type disclosed in the Redler Reissue Patent No. 18,445 may be successfully operated to float a short distance from the bottom of the casing and at the same time the accumulation and building up of material upon the casing when sticky flowable materials are being conveyed may be successfully prevented, thus insuring that the conveyer will operate in the manner intended and with maximum efficiency and minimum power consumption. I prefer however to utilize the forms of flights illustrated in Figs. 1, 2 and 3 in making up the conveyer member to the end that the maximum efficiency of the scrapers may be obtained.

While certain embodiments of the invention have been herein illustrated and described, it will be understood that the invention may be embodied in other forms within the scope of the following claims.

Having thus described the invention, what is claimed is:—

1. A conveyer for transporting flowable solid material in a mass having, in combination, a casing, a transporting member adapted to be drawn through the casing and provided with a plurality of open flights, said transporting member being provided with scraping means projecting beyond the contour of the flights a distance corresponding to the distance at which the transporting member floats from the casing and adapted to cooperate with the interior of the casing to remove material adhering thereto.

2. A conveyer for transporting flowable solid material in a mass having, in combination, a casing, a transporting member adapted to be drawn through the casing and provided with a plurality of open flights, at least one of said flights being provided with a scraper projecting beyond the periphery thereof at a distance corresponding to the distance at which the transporting member floats from the casing whereby to remove material adhering to the interior of the casing.

3. A conveyer for transporting flowable solid material in a mass having, in combination, a casing, a transporting member adapted to be drawn through the casing and provided with a plurality of open flights, a plurality of said flights spaced a substantial distance apart being provided with scraping members projecting beyond the periphery thereof and extending partially across the casing, said scraping members being staggered to effectively clean the entire width of the casing.

4. A conveyer for transporting flowable solid material in a mass having, in combination, a casing, a transporting member adapted to be drawn through the casing and provided with a plurality of open flights, at least one of said flights being provided with a scraping member extending angularly with relation to the direction of travel of the transporting member whereby to remove material adhering to the adjacent surface of the casing, said scraping member projecting beyond the under surface of the flight at a distance corresponding to the distance at which the transporting member floats from the casing.

5. A conveyer for transporting flowable solid material in a mass having, in combination, a casing, a transporting member adapted to be drawn through the casing and provided with a plurality of open flights, a plurality of said flights spaced a substantial distance apart being provided with scraping members projecting beyond the under surface thereof at a distance corresponding to the distance at which the transporting member floats from the casing and arranged in staggered relation to remove material adhering to the casing from the entire width thereof, some of said scraping members being arranged to extend angularly with relation to the direction of travel from the transporting member whereby to remove material adhering to the adjacent surface of the casing.

6. A conveyer for transporting flowable solid material in a mass having, in combination, a casing, a transporting member adapted to be drawn through the casing and provided with a plurality of open flights, said flights having portions cooperating with opposed walls of the casing, and some of said flights being provided with scrapers projecting beyond the under surface thereof at a distance corresponding to the distance at which the transporting member floats from the casing.

NIXON W. ELMER.